United States Patent

Guéniot

Patent Number: 5,624,070
Date of Patent: Apr. 29, 1997

[54] REUSABLE PACKAGING BOX

[75] Inventor: Gérard Guéniot, Lavigny, Switzerland

[73] Assignee: Tramapack S.A., Crisser, Switzerland

[21] Appl. No.: 553,578

[22] PCT Filed: Mar. 30, 1995

[86] PCT No.: PCT/CH95/00068

§ 371 Date: Nov. 29, 1995

§ 102(e) Date: Nov. 29, 1995

[87] PCT Pub. No.: WO95/26909

PCT Pub. Date: Oct. 12, 1995

[30] Foreign Application Priority Data

Mar. 31, 1994 [CH] Switzerland ............ 972/94-8

[51] Int. Cl.$^6$ ............................................. B65D 5/66
[52] U.S. Cl. .................... 229/155; 220/337; 220/339
[58] Field of Search ............... 229/125, 39, 155; 220/334, 337, 338, 339, 340, 341, 342, 343

[56] References Cited

U.S. PATENT DOCUMENTS

| | | | |
|---|---|---|---|
| 889,109 | 5/1908 | Davidson | 229/155 |
| 1,483,175 | 2/1924 | Guenther | 229/125.39 |
| 2,256,834 | 9/1941 | Mandel | 229/125.39 |
| 2,605,926 | 8/1952 | Casey | 220/338 |
| 4,163,496 | 8/1979 | Dogliotti | 220/339 |
| 4,333,602 | 6/1982 | Geschwender | 229/125.39 |
| 4,917,291 | 4/1990 | Saiki et al. | 229/155 |
| 5,076,460 | 12/1991 | Hussell | 220/338 |

FOREIGN PATENT DOCUMENTS

| | | |
|---|---|---|
| 2614277 | 10/1988 | France . |
| 3602632 | 7/1987 | Germany . |

*Primary Examiner*—Gary E. Elkins
*Attorney, Agent, or Firm*—Clifford W. Browning; Woodard, Emhardt, Naughton, Moriarty & McNett

[57] ABSTRACT

The present reusable packaging box having the shape of a rectangular parallelepiped includes four lateral walls (1, 2, 3, 4) joined together in such a manner that the lateral periphery of the box is closed, as well as two cover parts (5, 6) and bottom parts (7, 8), all substantially rectangular, forming each one an edge with a respective lateral wall and having a free border parallel to this edge. The free borders (5a, 6a) of the two cover and bottom parts include each one a profile of which the cross-section and the construction are such that these free borders can be joined together by the mutual engagement of these profiles.

8 Claims, 1 Drawing Sheet

REUSABLE PACKAGING BOX

The present invention is concerned with a reusable packaging box, in the shape of a rectangular parallelepiped, including four lateral walls joined together so that the lateral periphery of the box is closed, as well as at least two cover parts and at least two bottom parts, substantially rectangular, forming each one an edge with a respective lateral wall and having a free border parallel to this edge.

Such packaging boxes are generally manufactured from corrugated cardboard and their bottom and cover must be closed by self-adhesive tapes or by similar means. These known boxes can be reused only to a very limited extent, their properties and their appearance deteriorating rapidly owing to the manner in which they have to be closed.

SUMMARY OF THE INVENTION

The present invention is aimed at remedying this drawback and at providing a packaging box which can be closed or opened without using external means and without damaging the surface of the box. The invention is equally aimed at providing a robust multiple-use box, with possibilities of use, of manufacture and of recycling making significant cost savings possible and contributing to the protection of the environment.

To this end, the box according to the invention is characterized in that the free borders of the cover and/or the bottom parts include each a profile of a cross-section and construction such that these free borders can be joined by the interlocking of one profile with the other.

Such a box can be advantageously made of a plastic material from a sheet obtained by extrusion, with the profiles being integral with the borders to be joined together. The box according to the invention can also be made of corrugated cardboard, said profiles made of a plastic material being fastened to the borders to be joined together.

DESCRIPTION OF THE DRAWINGS

Other characteristics, aims and advantages of the invention will become more clearly apparent from the following description of non limiting exemplary embodiments, illustrated by the annexed drawing in which.

DESCRIPTION OF THE PREFERRED EMBODIMENTS

Figure 1:
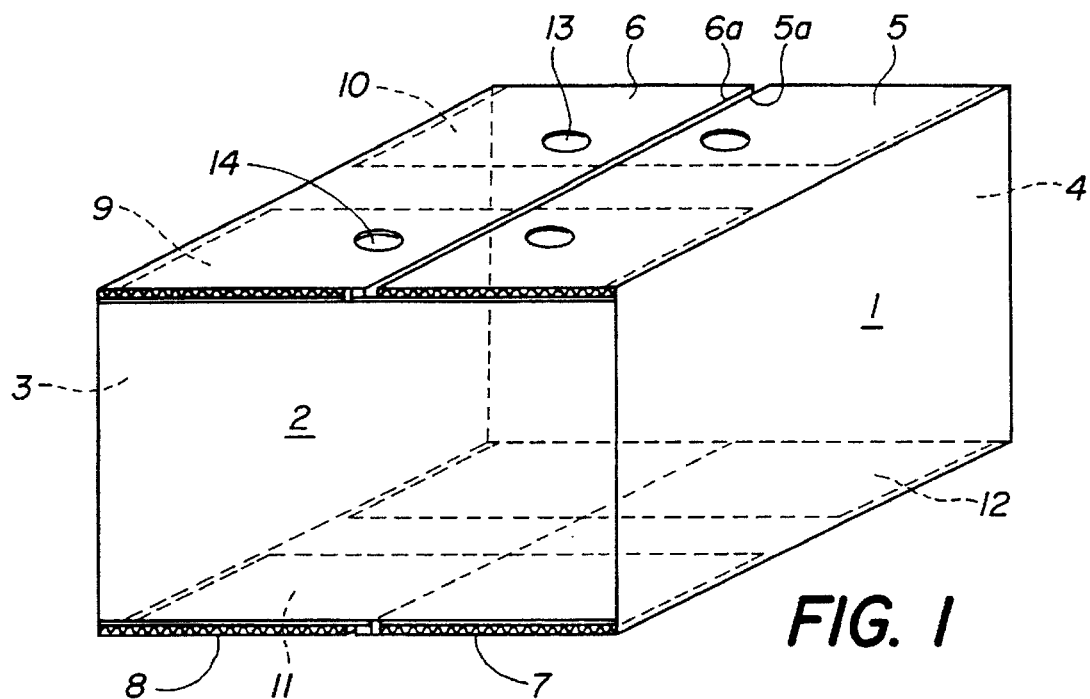
FIG. 1 is a schematic perspective view of a packaging box according to the invention.

The box represented schematically in FIG. 1 is made, for example, of a synthetic material such as polypropylene or polyethylene, from a sheet obtained by extrusion and cut out in the usual manner. These sheets can have, in cross-section, a structure similar to that of corrugated cardboard or include inner and outer layers of different materials.

The box of FIG. 1 shows four lateral rectangular walls 1 to 4 joined together after folding along their vertical edges, in such a manner as to produce a closed periphery. The cover and the bottom of the box include two respective parts 5, 6 and 7, 8 which will be closed outside, as well as two inner parts folded down in the direction perpendicular to that of parts 5 to 8, namely the parts 9 and 10 for the cover and 11 and 12 for the bottom of the box.

Figure 2:
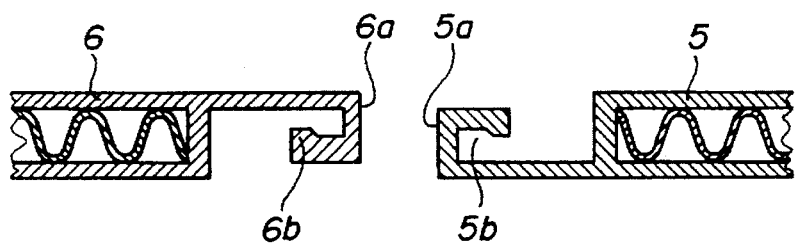
FIG. 2 is a cross-sectional view of the borders of two cover or bottom parts.

The parts 5 and 6 show free borders 5a and 6a which include respective profiles, such as shown, for example in FIG. 2. These profiles are integral with the sheet used for the manufacture of the box which can have a structure similar to that of a corrugated cardboard box.

The profiles forming the borders 5a and 6a can have, in cross-section, the shape of a hook, such as shown in FIG. 2. This configuration makes it possible to join together the two borders by interlocking the hooks one with the other, the curved part 6b fitting in this case into the recess 5b of part 5. To close the box, one only needs to bring together the borders 5a and 6a in such a manner as to ensure this interlocking, the flexibility of the lateral walls 1 and 3, to which the parts 5 and 6 are connected, making it possible, on the one hand, to bring together the free borders and to ensure that, on the other hand, owing to their elasticity, the profiles remain hooked together by the effect of forces tending to spread apart the borders 5a and 6a in the plane of the cover, perpendicularly to their longitudinal direction. Furthermore, the hooks can have a shape allowing them to snap together for better ensuring their interlocking, for example in the ease of a deformation of the box.

FIG. 1 shows that the parts 5 and 6 can be provided with openings such as 13, 14 designed for facilitating the bringing together of the parts 5 and 6 by introducing therein, for example, the thumb and the forefinger when closing or opening the box. On the other hand, it should be noted that the inner folded down parts 9, 10 and 11, 12 are slightly shorter in the direction of their common edges with the wall 2 or 4 than these side walls, the spacing thus provided facilitating the bending of the walls 1 and 3 when closing and opening the box.

The bottom of the box according to FIG. 1 is made in a manner totally similar to what has just been described for the cover.

Figure 3:
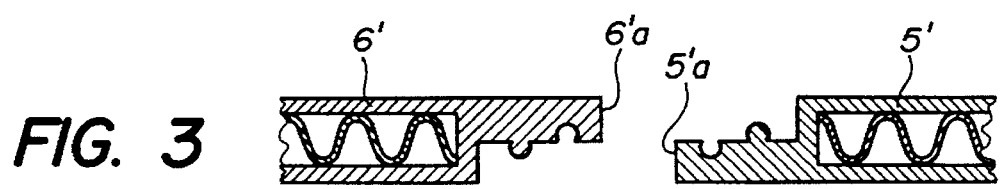
FIG. 3 is a cross-sectional view of another embodiment of these borders.

FIG. 3 shows another configuration of the profile forming the free borders 5'a and 6'a of the cover parts 5' and 6' and making it possible to interlock the profiles. This embodiment is preferably constructed so as to produce a slight snapping together ensuring the joining together of the borders not only in the plane of parts 5' and 6', but also in a direction perpendicular to this plane.

Figure 4:
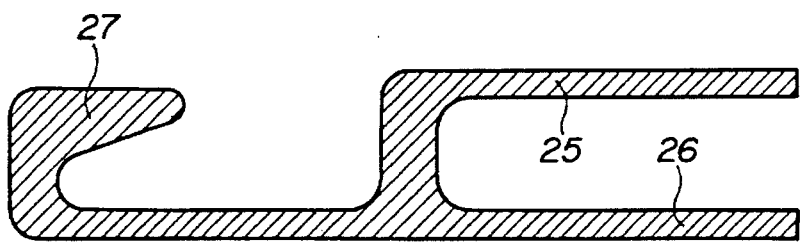
FIG. 4 is a cross-sectional view of an embodiment of a profile designed for fastening to the border of the two cover or bottom parts.

FIG. 4 shows an example of a profile designed for fastening, for example by welding or bonding, to the borders of the two cover or bottom parts of the box. The parts 25, 26 are used to fasten the profile on such a border, whereas part 27 enables the hooking of the matching profile, rotated by 180° of the opposite border, in a similar manner to the interlocking of the parts shown in FIG. 2.

The closing principle of the box according to the invention makes it possible to reuse the box many times before it is destroyed, for example incinerated or, preferably, its material is recycled to manufacture new products. This possibility of a repeated usage of the box makes it possible to put into practice a concept according to which the box is initially consigned to the user and refunding is provided for when the box is returned. The box can also be used in a closed circuit within one or several companies, which entails considerable cost savings during the service life of the box. Furthermore, the setting up of a box is very fast, which ensures time savings which are not negligible in the production lines, as well as cost savings owing to the suppression of the self-adhesive tapes which further avoids the elimination of corresponding wastes.

The present box can also be made from high resistance corrugated card-board, the profiles being in this case applied by bonding or by another usual fastening means.

When the box is made from a plate of plastic material, one can use, as the raw material for the manufacture of this plate, recycled material and operate by mono-extrusion or co-extrusion.

The plate of plastic material can be alveolar or solid. In the case of a solid plate, the profile can be thermoformed on the border. In one embodiment, the profile is manufactured separately and engaged with or engaged with and welded to the borders to be joined together.

The different properties and possibilities mentioned above are an important contribution to the reduction of the amount of waste and thus to the protection of the environment, while providing a packaging which is robust, cheap and extremely practical to use.

I claim:

1. A reusable packaging box, in the form of a rectangular parallelepiped, having four lateral walls joined together in such a manner that the lateral periphery of the box is closed, as well as at least two cover parts and at least two bottom parts substantially rectangular, forming each one an edge with a respective lateral wall and having a free border parallel to said edge, said free borders of said two cover and/or bottom parts including each one a profile, the cross-section and the construction of which are such that said free borders can be joined together by mutual engagement of said profiles.

2. A box according to claim 1, made of a plastic material from a plate obtained by extrusion in the direction of said free borders, wherein said profiles are integral with said borders.

3. A box according to claim 1, made of corrugated cardboard, wherein said profiles are made separately and fastened to the borders to be joined together.

4. A box according to claim 1, wherein the cross-section of said profiles has a shape of a hook.

5. A box according to claim 4, wherein the transverse cross-section of said profiles has a part arranged for engaging with a border of a cover or bottom part.

6. A box according to claim 1, wherein the cross-section of said profiles has matching protrusions and recesses making possible their snapping together.

7. A box according to claim 1, in which the cover and the bottom include two inner folded down parts forming an edge perpendicular to the direction of said free borders with the respective lateral walls, wherein said inner parts are shorter, in the direction of said edge, than the lateral wall with which they form said edge.

8. A box according to claim 1, wherein said two cover and bottom parts including said profiles have each cut-out holes, the holes of the two different parts being aligned in a direction perpendicular to said profiles and having each a size allowing the introduction of a finger.

* * * * *

UNITED STATES PATENT AND TRADEMARK OFFICE
CERTIFICATE OF CORRECTION

PATENT NO. : 5,624,070
DATED : April 29, 1997
INVENTOR(S) : Gérard Guéniot

It is certified that error appears in the above-indentified patent and that said Letters Patent is hereby corrected as shown below:

In column 2, line 26, please delete "ease" and insert in lieu thereof --case--.

Signed and Sealed this

Fourteenth Day of October, 1997

Attest:

BRUCE LEHMAN

Attesting Officer

Commissioner of Patents and Trademarks